(12) United States Patent
Kim et al.

(10) Patent No.: US 11,066,021 B2
(45) Date of Patent: Jul. 20, 2021

(54) INDOOR SECRET STORAGE STRUCTURE OF VEHICLE

(71) Applicants: Hyundai Motor Company, Seoul (KR); Kia Motors Corporation, Seoul (KR); NIFCO KOREA INC., Asan-si (KR); HYUNDAI MOBIS CO., LTD., Seoul (KR)

(72) Inventors: Hye Kyung Kim, Suwon-Si (KR); Dae Ig Jung, Suwon-Si (KR); Young Ju Lee, Suwon-Si (KR); Seung Hyeok Chang, Suwon-Si (KR); Jae Whoan Park, Cheonan-Si (KR); Jong Chae Lee, Asan-Si (KR); Gi Seung Choi, Asan-Si (KR)

(73) Assignees: Hyundai Motor Company, Seoul (KR); Kia Motors Corporation, Seoul (KR); NIFCO KOREA INC., Asan-si (KR); HYUNDAI MOBIS CO., LTD., Seoul (KR)

( * ) Notice: Subject to any disclaimer, the term of this patent is extended or adjusted under 35 U.S.C. 154(b) by 113 days.

(21) Appl. No.: 16/584,665

(22) Filed: Sep. 26, 2019

(65) Prior Publication Data
US 2020/0189477 A1 Jun. 18, 2020

(30) Foreign Application Priority Data
Dec. 14, 2018 (KR) .......................... 10-2018-0161571

(51) Int. Cl.
*B60R 7/06* (2006.01)
(52) U.S. Cl.
CPC ...................................... *B60R 7/06* (2013.01)

(58) Field of Classification Search
CPC ....... B60R 7/06; E05F 15/00; E05Y 2900/538
USPC ...................................................... 296/37.12
See application file for complete search history.

(56) References Cited

U.S. PATENT DOCUMENTS

| 2,518,985 | A | * | 8/1950 | Geyh | ..................... | A47B 21/02 |
| | | | | | | 312/273 |
| 5,460,309 | A | * | 10/1995 | Nehl | ....................... | B60R 7/082 |
| | | | | | | 224/281 |
| 6,120,077 | A | * | 9/2000 | Westphal | ................ | B60R 7/005 |
| | | | | | | 296/37.13 |
| 8,104,816 | B2 | * | 1/2012 | Lupton, III | ............ | H01R 13/72 |
| | | | | | | 296/37.1 |

(Continued)

FOREIGN PATENT DOCUMENTS

KR    10-2015-0071523 A    6/2015

*Primary Examiner* — Pinel E Romain
(74) *Attorney, Agent, or Firm* — Morgan, Lewis & Bockius LLP

(57) ABSTRACT

An internal storage structure of a vehicle may include a housing including an opening and configured of having a storage space disposed inside a crash pad, a cover portion configured to include a display module and to cover the opening, a first guide rail configured to be disposed on the side surface of the housing to be tilted by a predetermined angle, and a second guide rail configured to be disposed on the lower end portion of the cover portion to interlock with a gear portion disposed on the lower surface of the housing, and the cover portion is configured to be tilted forwardly along the second guide rail, and to move downwardly along the first guide rail and the second guide rail.

17 Claims, 13 Drawing Sheets

(56) References Cited

U.S. PATENT DOCUMENTS

| | | | | |
|---|---|---|---|---|
| 8,127,962 B2* | 3/2012 | Kogami | ................... | B60R 7/06 |
| | | | | 220/348 |
| 8,398,139 B2* | 3/2013 | Blackmore | ............... | B60R 7/06 |
| | | | | 296/37.12 |
| 8,403,190 B2* | 3/2013 | Woo | ....................... | B60R 11/00 |
| | | | | 224/281 |
| 8,596,702 B2* | 12/2013 | Quijano | ................... | B60R 7/04 |
| | | | | 296/24.34 |
| 9,409,523 B2* | 8/2016 | Cho | ........................ | B60R 7/06 |
| 9,469,253 B2* | 10/2016 | Brunard | .................. | B60R 11/02 |
| 9,827,926 B2* | 11/2017 | Duran Hernandez | ....................... | |
| | | | | B60R 16/0239 |
| 2005/0061026 A1* | 3/2005 | Choi | ...................... | F25B 39/02 |
| | | | | 62/515 |
| 2006/0066120 A1* | 3/2006 | Svenson | .................. | B60R 7/06 |
| | | | | 296/37.12 |
| 2014/0110962 A1* | 4/2014 | Bohnenberger | .......... | B60R 7/06 |
| | | | | 296/37.12 |
| 2014/0183896 A1* | 7/2014 | Cho | ......................... | B60R 7/06 |
| | | | | 296/37.12 |

* cited by examiner

[ before opening display part ]

[ after opening display part ]

INDOOR SECRET STORAGE STRUCTURE OF VEHICLE

CROSS-REFERENCE TO RELATED APPLICATION

The present application claims priority to Korean Patent Application No. 10-2018-0161571 filed on Dec. 14, 2018, the entire contents of which is incorporated herein for all purposes by this reference.

BACKGROUND OF THE INVENTION

Field of the Invention

The present invention relates to an internal secret storage structure of a vehicle, and to an internal secret storage structure of a vehicle, which forms a housing disposed inside a crash pad of a vehicle and having an opening at one end portion thereof, and a cover portion configured to be fixed to a display module and to cover the opening, and the cover portion is opened without interfering with the crash pad according to a user's request.

Description of Related Art

Convenience devices provided to a vehicle include a cigar lighter used for lighting a cigarette, a cup holder used for fixing a beverage or a cup, or the like, and a storage device such as a console box and a glove box in which a driver and a passenger may store the items necessary in a passenger compartment of the vehicle, and a tray configured for collecting the cigarette ash or storing a small volume item such as a coin or a card. Furthermore, the vehicle is mounted with various convenience devices according to the driver's hobby and needs.

In general, the storage device such as a glove box or a tray is disposed in the front passenger seat of an instrument panel or the center fascia. The storage device may include a main body having a receiving space formed inside the instrument panel or the center fascia and having a front surface opened toward a driver seat or a front passenger seat, and a door mounted on an opened front surface of the main body to open or close the main body.

Furthermore, for convenience of the user, a hinge-coupled type storage space formed near the center fascia where the display module is disposed is recently provided, and is configured to include the function of charging a personal communication device and the like.

As illustrated in FIG. 1, a storage device of a portable device configured for a vehicle may include a storage portion 102 for storing a portable device of the user, and provides a storage device configured for charging the portable device by anchoring the portable device 104 of the user in the storage portion.

However, in recent years, there has been a problem in that the display module is configured to occupy a wider region in the center fascia to improve the visibility of the user, and the storage space disposed within the vehicle is insufficient as the size of the portable device of the user increases.

Furthermore, there has been a problem in that the privacy of the individual is not protected due to the absence of the storage space which is not exposed to the outside.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an internal secret storage structure of a vehicle, which is not exposed, inside a crash pad.

Various aspects of the present invention are directed to providing an internal secret storage structure of a vehicle, which may include first and second guide rails for avoiding bottom interference when a cover portion configured of including a display module is opened.

Furthermore, various aspects of the present invention are directed to providing an internal secret storage structure of a vehicle for providing a wider storage space, enhancing convenience of the user.

The objects of the present invention are not limited to the above-described objects, and other objects of the present invention that are not described may be understood by the following description, and may be more clearly understood by the exemplary embodiments of the present invention. Furthermore, the objects of the present invention may be realized by the means recited in the claims and a combination thereof.

An internal secret storage structure of a vehicle for achieving the above-described objects of the present invention may include the following configurations.

Various aspects of the present invention provide an internal secret storage structure of a vehicle including a housing including an opening and configured of having a storage space disposed inside a crash pad, a cover portion configured of including a display module and covering the opening, a transfer plate be disposed on the rear surface of the housing to be connected to the cover portion, a first guide rail disposed on the housing to guide so that the cover portion is opened, a second guide rail disposed on the housing to guide the movement of the transfer plate interlocked with a conveying block, and a rotation driving portion engaged to the conveying block and configured to move the conveying block forwardly and backwardly, and the cover portion is configured to be opened by moving in the horizontal and vertical directions of the housing along the first guide rail and the second guide rail interlocking with the conveying block.

Furthermore, various aspects of the present invention provide the internal secret storage structure of the vehicle further including a slide panel configured to be disposed on the rear surface of the housing, and to interlock with the conveying block to move forwardly and backwardly.

Furthermore, various aspects of the present invention provide the internal secret storage structure of the vehicle further including a holder portion configured to be disposed at one end portion where the slide panel faces the cover portion and to be moved out to the upper portion of the slide panel.

Furthermore, various aspects of the present invention provide the internal secret storage structure of the vehicle in which the holder portion is configured to slidably move in the width direction of the slide panel.

Furthermore, various aspects of the present invention provide the internal secret storage structure of the vehicle further including a slide link interlocking the slide panel and the conveying block.

Furthermore, various aspects of the present invention provide the internal secret storage structure of the vehicle in which both end portions of the slide link are configured to be connected to the housing and the conveying block, and the middle end portion of the slide link is configured to be coupled to the slide panel.

Furthermore, various aspects of the present invention provide the internal secret storage structure of the vehicle in which one end portion of the slide link is configured to be hinged to the housing, and the other end portion thereof connected to the conveying block is configured to include a groove portion.

Furthermore, various aspects of the present invention provide the internal secret storage structure of the vehicle further including a guide pipe disposed inside the housing to guide the movement of the conveying block.

Furthermore, various aspects of the present invention provide the internal secret storage structure of the vehicle further including a guide hole configured so that a connection portion configured to connect the first guide rail and the cover portion moves along the housing.

Furthermore, various aspects of the present invention provide the internal secret storage structure of the vehicle further including a blocking portion disposed on the rear surface of the guide hole in a state where the cover portion has been opened.

The present invention may obtain the following effects by the above-described embodiments, and configurations and a combination thereof, and the use relationship therebetween, which will be described below.

The present invention may provide the storage structure which is not exposed to the outside, enhancing stability of the user and protecting privacy.

Furthermore, the present invention may provide a wider storage space through the opening of the cover portion including the display module, increasing convenience of the user.

Furthermore, the present invention may provide a mechanism for avoiding interference with the crash pad, increasing the degree of freedom of design.

Other aspects and exemplary embodiments of the disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the disclosure are discussed infra.

Figure 1:
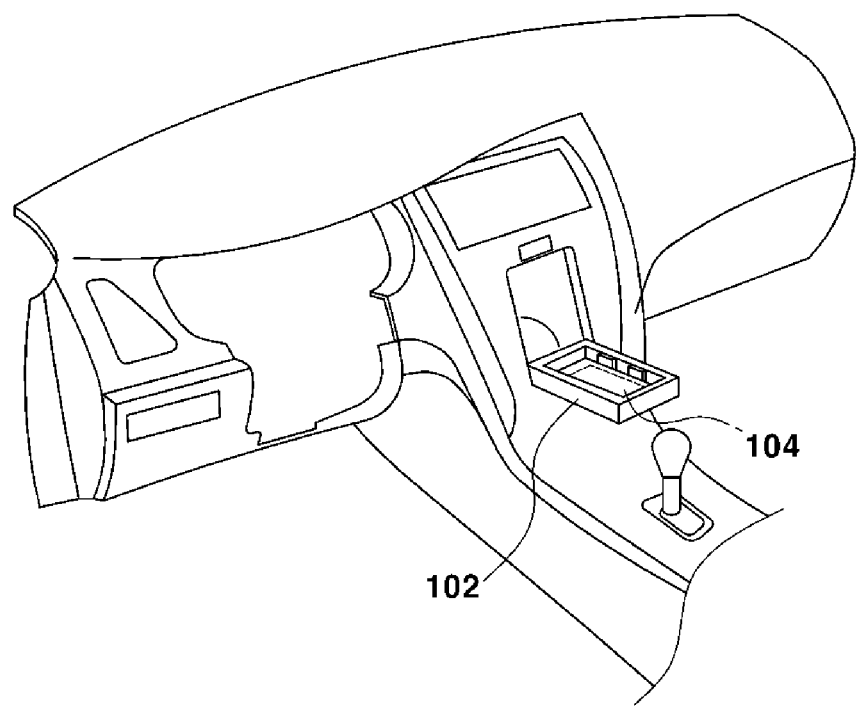
FIG. 1 is a perspective diagram of a storage structure for charging a portable device, as the related art.

It may be understood that the appended drawings are not necessarily to scale, presenting a somewhat simplified representation of various exemplary features illustrative of the basic principles of the disclosure. The specific design features of the present invention as included herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in more detail with reference to the accompanying drawings. The exemplary embodiments of the present invention may be modified in various forms, and the scope of the present invention may not be construed as being limited to the following embodiments. The present exemplary embodiment of the present invention is provided to more fully explain in an exemplary embodiment of the present invention to those skilled in the art.

Furthermore, the term " . . . part," " . . . module" and the like described in the specification mean a unit of processing at least one function or operation, and This may be implemented by hardware or software or a combination of hardware and software.

Furthermore, in the exemplary embodiment, the name of the configuration is divided into the first, the second, and the like to distinguish the names of the configurations from each other in the same relationship, and is not necessarily limited to the order in the following description.

The present invention relates to an internal secret storage structure 100 of a vehicle, which is disposed in a crash pad 300, and provides a storage space disposed on the inside surface of a display module, and provides a space not exposed to the outside.

Figure 2A:
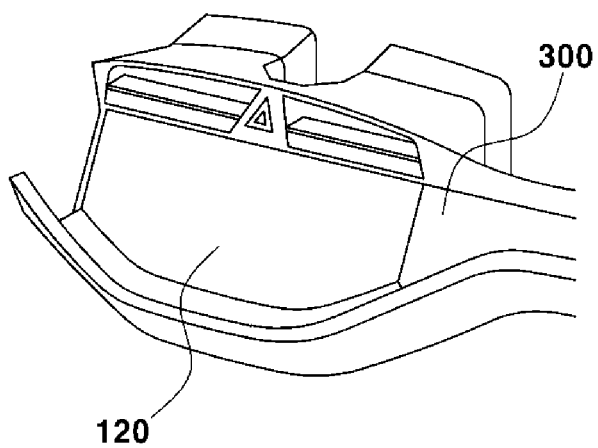
FIG. 2A and FIG. 2B are perspective diagrams of an internal secret storage structure of a vehicle, as an exemplary embodiment of the present invention.
Figure 2B:
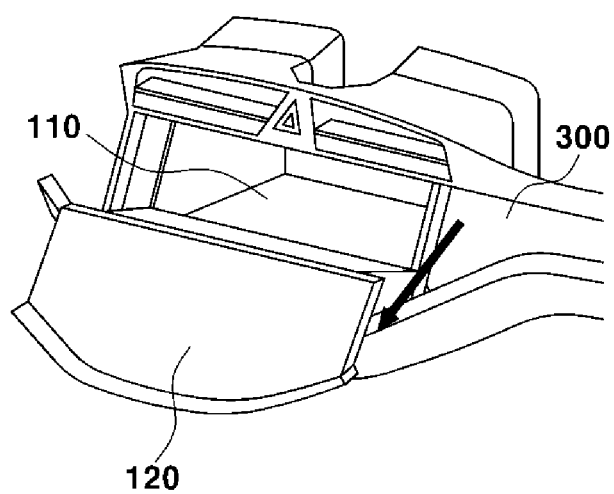
Figure 3:
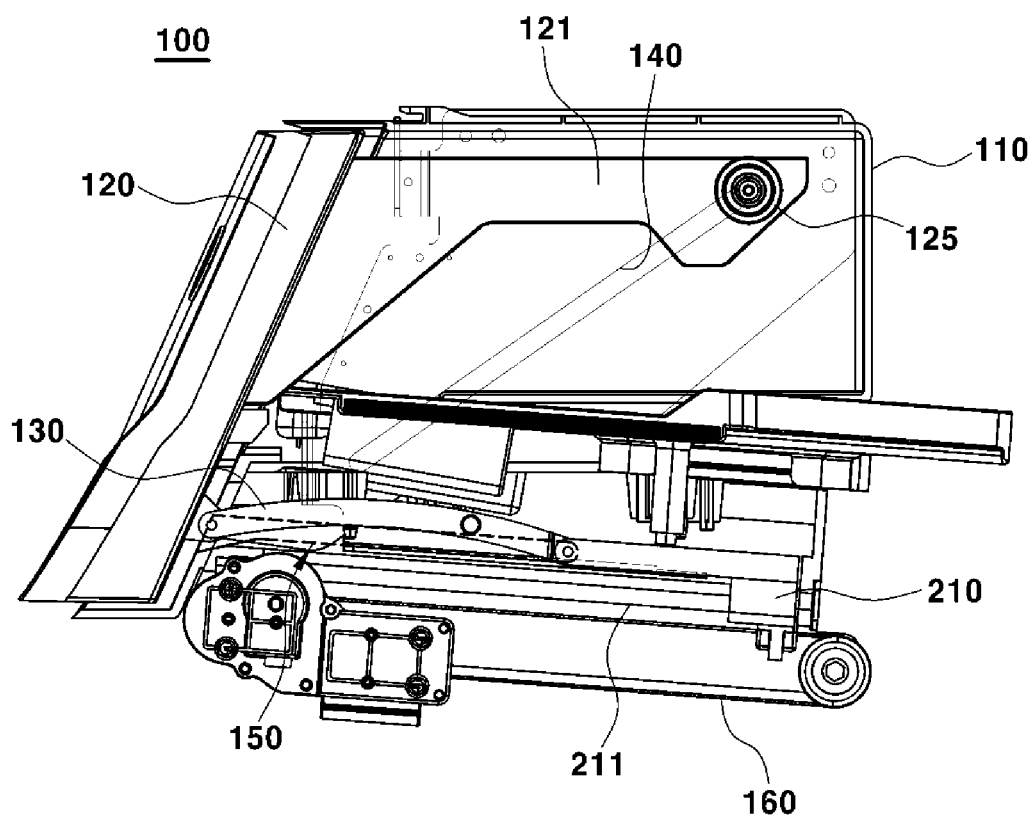
FIG. 3 is a side sectional diagram of the internal secret storage structure of the vehicle, as an exemplary embodiment of the present invention.

FIGS. 2A and 2B and FIG. 3 are a schematic diagram and a side sectional diagram of the internal secret storage structure 100 of the vehicle, as an exemplary embodiment of the present invention.

As illustrated in FIGS. 2A and 2B, the internal secret storage structure 100 of the vehicle is configured to dispose on the same plane as a portion of the crash pad, and is configured in a state where the lower storage space thereof is covered by the cover portion 120 including the display module.

That is, the internal secret storage structure 100 of the vehicle provides the storage space through a housing 110 inserted into the crash pad 300, and one end portion of the housing 110 is configured to include an opening. The housing 110 may be disposed inside the center fascia of the vehicle, or may be disposed on the inside surface of the crash pad 300 of the upper end portion of the front passenger seat.

Furthermore, the internal secret storage structure 100 of the vehicle may include the cover portion 120 configured to cover the opening of the housing 110, and in an exemplary embodiment of the present invention, the cover portion 120 is configured to be fixed so that the display module faces the user, and to include a connection portion 121 disposed on both side end portions of the rear surface of the cover portion 120.

Furthermore, a guiderail bracket disposed on both side surfaces of the housing 110 may be configured to include a first guide rail 140 and a second guide rail 150.

FIG. 3 is a side sectional diagram of the secret storage structure 100 of the present invention, and the first guide rail 140 has a predetermined angle in the diagonal direction of the housing 110, and the connection portion 121 disposed at both side end portions of the cover portion 120 is configured to move along the first guide rail 140. The connection portion 121 disposed at both side end portions of the cover portion 120 may include a protrusion portion 125 which is moved along the first guide rail 140, and may further include a fixing portion which is fastened to the end portion of the protrusion portion, and the connection portion 121 is configured to move along the first guide rail 140 so that the cover portion 120 is opened.

As described above, the first guide rail 140 is configured to extend from the rear upper portion of the side surface of the housing 110 to the front lower portion of the side surface of the housing 110 so that the cover portion 120 may be opened when the connection portion 121 is moved along the first guide rail 140.

In an exemplary embodiment of the present invention, the first guide rail 140 may be configured to move downwardly by the own weight of the cover portion 120 without the presence of a separate driving force, and in another exemplary embodiment of the present invention, it may be configured to include an additional driving device configured for applying a driving force to the connection portion 121 moving along the first guide rail 140.

The first guide rail 140 has a main trajectory for determining the operation direction of the cover portion 120, and when the cover portion 120 starts to be moved out from the opening of the housing 110, the shape of the rail may be set to prevent interference with the crash pad 300 disposed on the lower end portion of the housing 110.

The first guide rail 140 is configured to set the moving path of the connection portion 121, and is configured so that the connection portion 121 is moved from the rear upper portion of the side surface of the housing 110 to the front lower portion thereof.

Furthermore, the lower end portion of the rear surface of the cover portion 120 includes a transfer plate 130 configured to be movable in the front-and-rear longitudinal direction of the housing 110, at least a portion of the transfer plate 130 is configured to move along the second guide rail 150, and the second guide rail 150 may be configured so that the cover portion 120 is moved out forwardly by interlocking with the transfer plate 130 disposed on the lower surface of the housing 110.

That is, the lower end portion of the rear surface of the cover portion 120 includes the transfer plate 130 for moving along the second guide rail 150, and one end portion of the transfer plate 130 is hinged to the lower surface of the cover portion 120, and the other end portion thereof is hinged to a conveying block 210 so that a driving force applied from a rotation driving portion 160 is transmitted to the cover portion 120 through the transfer plate 130.

The second guide rail 150 has a certain curvature toward the front surface of the housing 110 including the opening to guide the movement of the cover portion 120 so that the cover portion 120 may move downwardly from the opening of the housing 110 to open the storage portion. Furthermore, the transfer plate 130 is configured to be hinged to the cover portion 120 so that the cover portion 120 may additionally rotate and move downwardly with respect to the moving block to be fully opened.

The internal secret storage structure 100 of the vehicle includes the rotation driving portion 160 for providing a driving force so that the conveying block 210 moves forwardly and backwardly in contact with the conveying block 210, and in an exemplary embodiment of the present invention, the rotation driving portion 160 may be composed of a power transfer timing belt, and is disposed so that the conveying block 210 contacts with the upper surface of the power transfer timing belt.

Furthermore, the internal secret storage structure 100 of the vehicle includes at least one power portion disposed inside both end portions of the power transfer timing belt, and is configured so that the power portion rotates the power transfer timing belt, and the conveying block 210 disposed to contact with the power transfer timing belt moves in the longitudinal direction of the housing 110.

Furthermore, the conveying block 210 is configured to surround at least one guide pipe 211 disposed in the longitudinal direction of the housing 110, and is configured to move along the guide pipe 211 in the longitudinal direction of the vehicle.

In an exemplary embodiment of the present invention, the conveying block applies a driving force to the transfer plate 130 configured to move along the second guide rail 150, and is configured so that the cover portion 120 connected to one end portion of the transfer plate 130 may be moved in the direction away from the housing 110.

Furthermore, the display module of the present invention may include a switch portion for driving the cover portion 120, and may further include a password input portion to drive the cover portion 120 according to a password input of the user. And, the cover portion 120 may include the display module together with the switch portion.

Figure 4A:
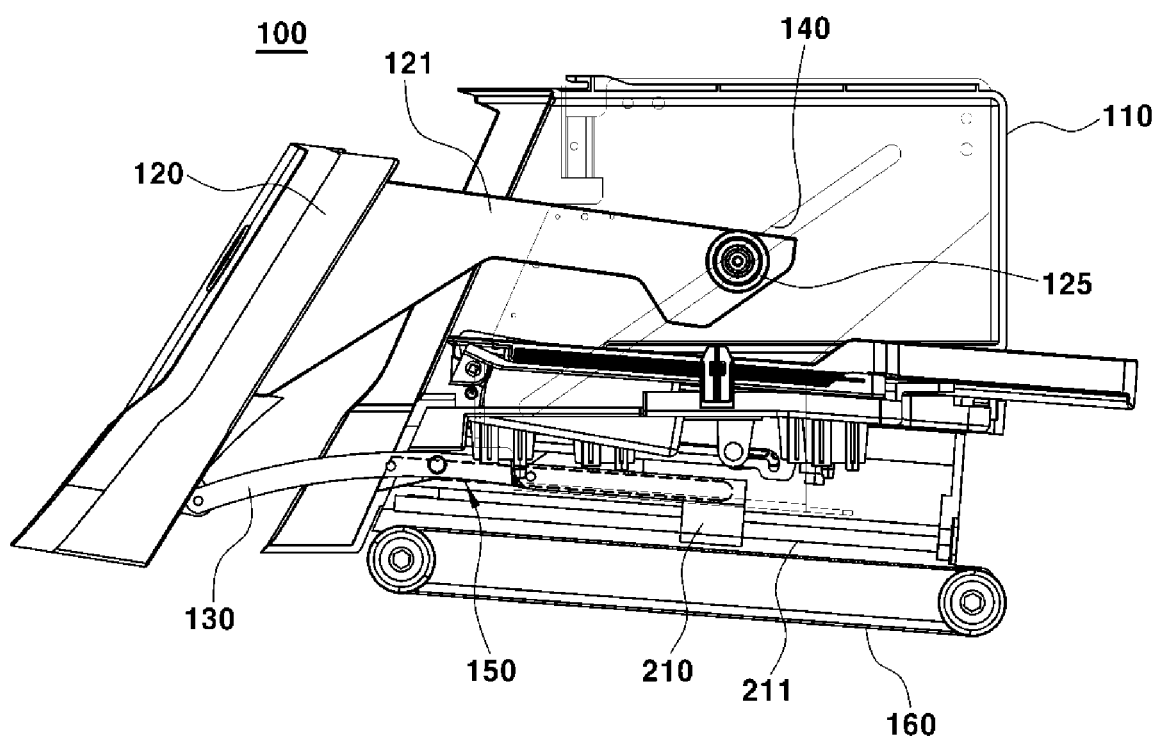
FIG. 4A and FIG. 4B are diagrams illustrating an operation of the internal secret storage structure of the vehicle, as an exemplary embodiment of the present invention.
Figure 4B:
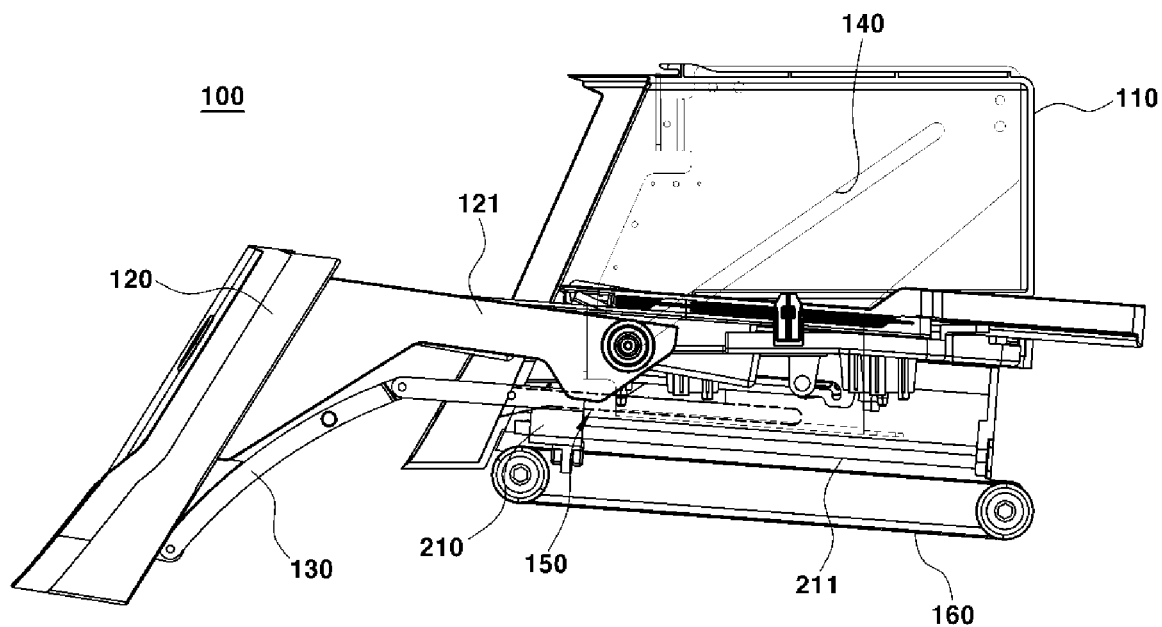

FIG. 4A and FIG. 4B are diagrams illustrating an operation of performing opening of the internal secret storage structure 100 of the vehicle, as an exemplary embodiment of the present invention.

As illustrated in FIG. 3, the cover portion 120, which is firstly kept in a closed state, is configured so that the cover portion 120 is opened according to a user's request. When the cover portion 120 is opened, the guide portion is configured to move downwardly along the first guide rail 140, a driving force of the rotation driving portion 160 is applied thereto in a response to the downward movement of the guide portion, and the transfer plate 130 is configured to move to the front surface of the housing 110.

Furthermore, the transfer plate 130 is configured to be hinged to the lower surface of the cover portion 120 and the conveying block 210, respectively, and to be rotatable in a response to the downward movement of the cover portion 120.

That is, when the cover portion 120 is opened, the cover portion 120 is configured to move downwardly from the opening of the housing 110, and in an exemplary embodiment of the present invention, the cover portion 120 moves at substantially the same angle as the first guide rail 140. Furthermore, to support the lower surface of the cover portion 120 moving along the guide portion, the conveying block 210 to which the driving force of the rotation driving portion 160 is transmitted is configured to be moved in the front direction of the housing 110.

The transfer plate 130 is configured to receive the driving force from the conveying block to move along the shape of the second guide rail 150. In an exemplary embodiment of the present invention, the second guide rail 150 may include a certain curvature. Furthermore, in another exemplary embodiment of the present invention, the second guide rail 150 may include the sloped shape to have a certain angle toward the opening of the housing 110 after the transfer plate 130 is moved horizontally as the cover portion 120 is opened. That is, the shape of the second guide rail 150 in an exemplary embodiment of the present invention may be set to correspond to the fully opened state of the cover portion 120.

Figure 5A:
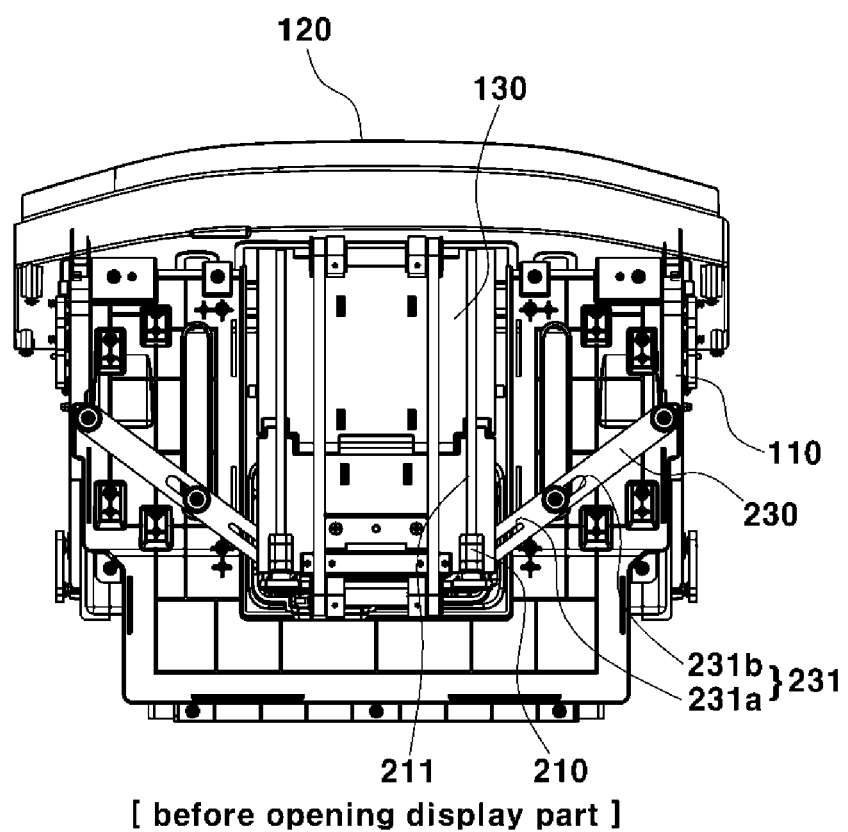
FIG. 5A and FIG. 5B are rear elevational diagrams of the internal secret storage structure of the vehicle, as an exemplary embodiment of the present invention.
Figure 5B:
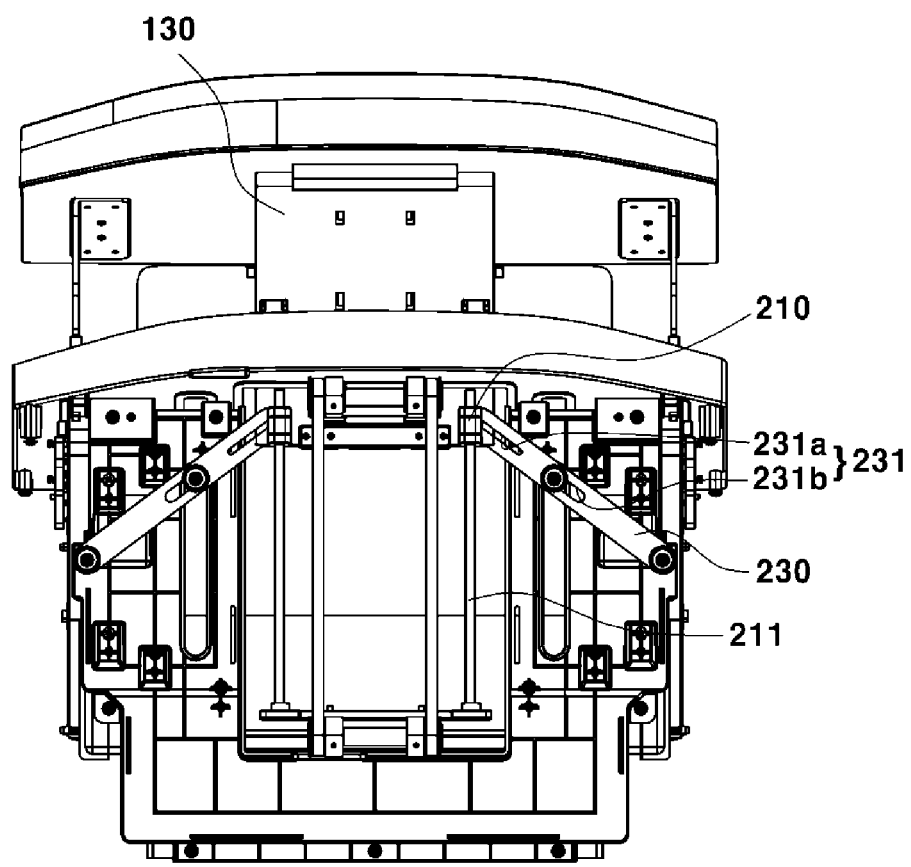

FIG. 5A and FIG. 5B are diagrams illustrating the coupling between configurations disposed on the rear surface of the housing 110, as an exemplary embodiment of the present invention.

As illustrated, the rear surface of the housing 110 includes the transfer plate 130 hinged to the lower end portion of the cover portion 120, the conveying block 210 configured to be hinged to the other end portion of the transfer plate 130 to apply a driving force to the transfer plate 130, and the second guide rail 150 configured to move in a portion of the transfer plate 130 to guide the movement thereof.

Furthermore, the internal secret storage structure 100 of the vehicle includes a slide link 230 configured to integrally connect the conveying block 210, a slide panel 220, and the housing 110, and when the conveying block 210 moves forwardly and backwardly, a groove portion 231 is configured to be included inside the slide link 230 so that a length from one end portion of the housing 110 hinged to the slide link 230 to the conveying block 210 varies.

The slide link 230 is configured to include a first groove portion 231a at the position facing the conveying block 210 and to include a second groove portion 231b disposed at a center portion facing the slide panel 220, and is configured so that the driving force transmitted along the conveying block 210 is transmitted to the slide panel 220 through the slide link 230.

In brief, one end portion of the slide link 230 is configured to be hinged to be rotatable with respect to the housing 110, and to include the groove portion 231 at the position where the slide panel 220 and the slide link 230 face each other and at the position where the conveying block 210 and the slide link 230 face each other. Furthermore, when the conveying block 210 is moved by the rotation driving portion 160, the slide link 230 is configured to rotate with respect to the housing 110.

Furthermore, a length between the respective configurations fastened to the slide link 230 varies according to the movement of the conveying block 210, and the slide link 230 is configured to include the first groove portion 231a and the second groove portion 231b, and the configurations connected to the slide link 230 are formed to interlock with each other according to the movement of the conveying block 210.

The slide panel 220 is configured to be disposed on the lower surface of the housing 110, and to be disposed in a space between the cover portion 120 opened along the conveying block 210 and the housing 110 when the cover portion 120 is opened.

As described above, the present invention is configured so that the transfer plate 130 and the slide panel 220 are interlocked with each other through the driving force applied to the conveying block 210 when the cover portion 120 is opened, and provides a coupling structure in which a plurality of configurations are interlocked with each other through the driving force transmitted through a single driving portion.

Figure 6A:
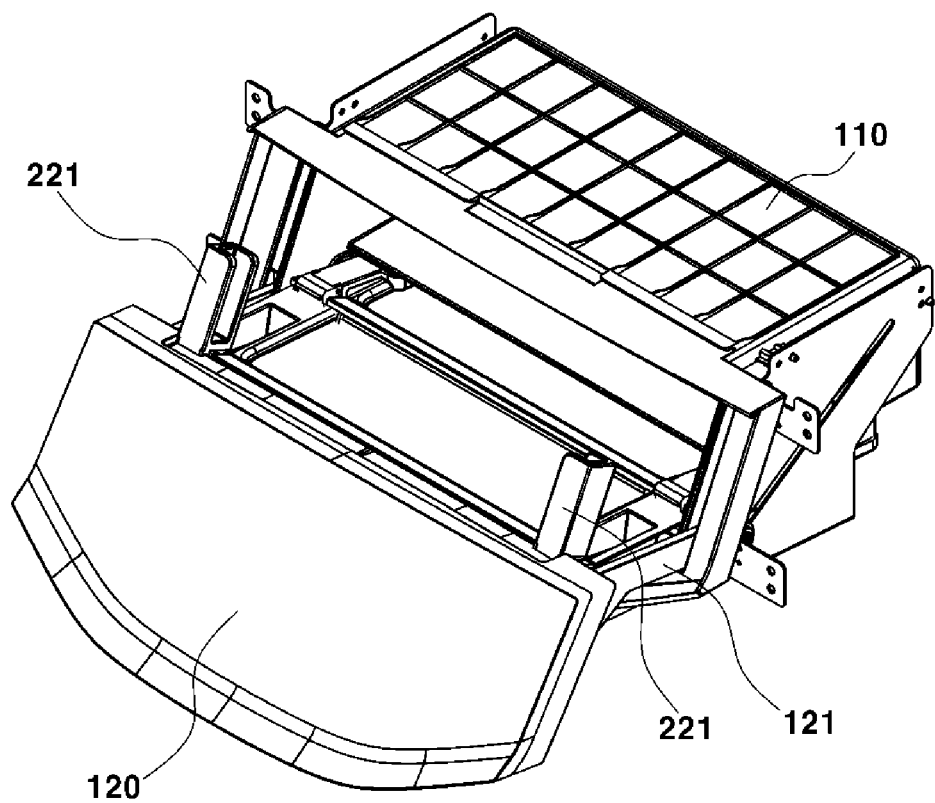
FIG. 6A and FIG. 6B are perspective diagrams of an opened cover portion of the internal secret storage structure of the vehicle, as an exemplary embodiment of the present invention.
Figure 6B:
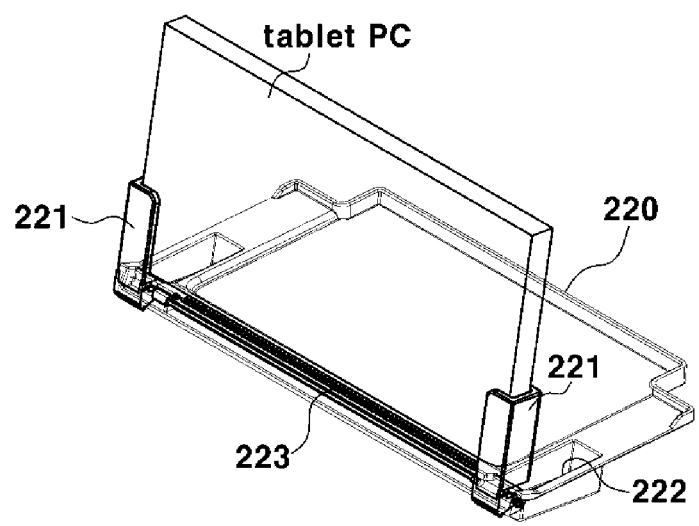

FIGS. 6A and 6B are diagrams illustrating a holder portion 221 disposed on the slide panel 220, as an exemplary embodiment of the present invention.

As illustrated, the internal secret storage structure 100 of the vehicle provides the slide panel 220 configured to be moved out between the opened cover portion 120 and the housing 110, and the upper surface of the slide panel 220 includes a plurality of holder parts 221 configured to correspond to each other.

The holder portion 221 may be configured so that an electronic device or a tablet PC, or the like of the user is anchored, and in an exemplary embodiment of the present invention, the c formed with at least two is configured to be varied.

In an exemplary embodiment of the present invention, a guide bar 223 is mounted on a side of the side panel 220 and the holder portion 221 formed with at least two is slidably coupled to the guide bar 223 to adjust a width between the holder portions 221.

In an exemplary embodiment of the present invention, at least one holder portion 221 may include a spring configured to be tensioned laterally, and is configured so that an interval between the holder portions 221 may be adjusted according to the size of the electronic device or the tablet PC or the like.

In an exemplary embodiment of the present invention, the spring is coupled between the holder portion 221 and the slide panel 220 to bias the holder portion 221 to a predetermined direction.

In an exemplary embodiment of the present invention, the holder portions 221 is rotatably mounted to the slide panel 220 and the slide panel 220 includes receiving grooves 222 to selectively receive the holder portions 221 therein. Furthermore, the holder portion 221 disposed on the slide panel may be configured to be moved in to be parallel with the upper surface of the slide panel, and may be configured to be moved out automatically or manually according to the user's request.

The slide panel may be configured to wirelessly charge the electronic device, and may include a wireless charging module, which may charge a mobile device disposed on the upper portion of the slide panel regardless of whether the cover portion 120 is opened or closed.

Figure 7A:
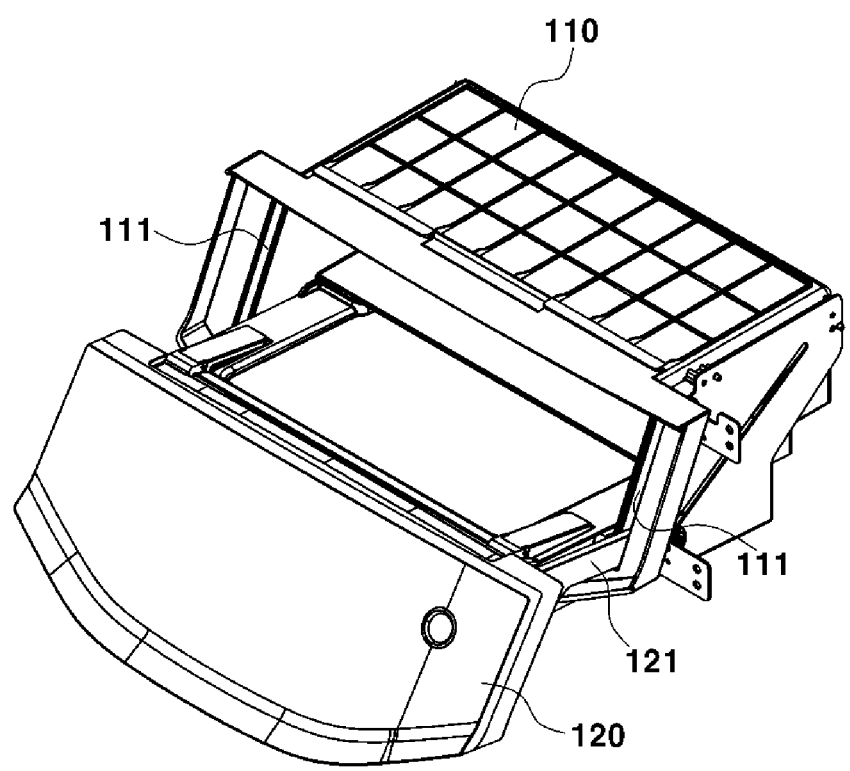
FIG. 7A, FIG. 7B and FIG. 7C are diagrams illustrating an operation of the cover portion of the internal secret storage structure of the vehicle, as an exemplary embodiment of the present invention.
Figure 7B:
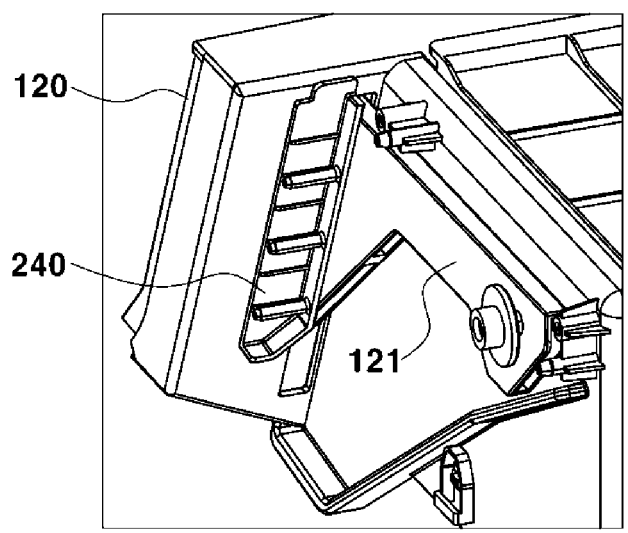
Figure 7C:
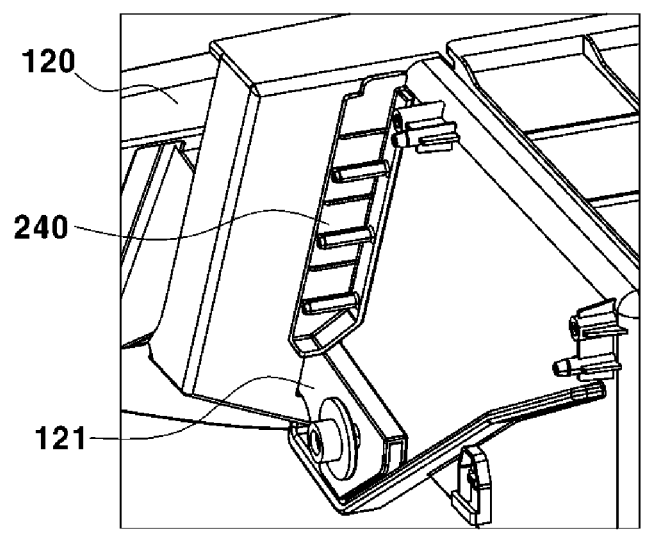

FIGS. 7A, 7B and 7C include the connection portion 121 configured to open the cover portion 120, a guide hole 111 disposed at both side end portions of the housing 110 which is the moving path of the connection portion 121, and a blocking portion 240 configured to cover the rear surface of the guide hole 111 as an exemplary embodiment of the present invention.

The blocking portion 240 is configured to be disposed adjacent to the guide hole 111 when the connection portion 121 of the housing 110 is disposed in the guide hole 111, and when the cover portion 120 is in the fully opened state, the blocking portion 240 is moved to cover the rear surface of the guide hole 111.

The blocking portion 240 in an exemplary embodiment of the present invention may further include an elastic portion to which tension is applied to be disposed on the rear surface of the guide hole 111, and as the guide portion is fully opened, the blocking portion 240 is configured so that the guide hole 111 is blocked from the outside.

As illustrated, the guide hole 111 is disposed at both side end portions of the opening of the housing 110, and the connection portion 121 for connecting the cover portion 120 and the first guide hole is configured to move perpendicularly along the guide hole 111.

When the connection portion 121 moves downwardly along the guide hole 111, the blocking portion 240 configured on the rear surface of the housing 110 where the guide hole 111 is disposed is configured to block the guide hole 111, and provides a configuration for preventing dust from being flowed into the crash pad 300.

Furthermore, the blocking portion 240 in an exemplary embodiment of the present invention is configured to interlock with the connection portion 121, and the blocking portion 240 is configured to selectively cover the guide hole 111 according to the position of the connection portion 121.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An internal storage structure of a vehicle, the internal storage structure comprising:
   a housing including an opening and configured of having a storage space disposed inside a crash pad;
   a cover portion configured to cover the opening;
   a transfer plate be disposed on a rear surface of the housing to be connected to the cover portion;
   a first guide rail mounted on the housing and coupled to the cover portion to guide the cover portion so that the cover portion is selectively opened;
   a second guide rail mounted on the housing and coupled to the transfer plate to guide a movement of the transfer plate interlocked with a conveying block; and
   a rotation driving portion engaged to the conveying block and configured to move the conveying block forwardly and backwardly,
   wherein the cover portion is configured to be opened by moving in horizontal and vertical directions of the housing along the first guide rail and the second guide rail interlocking with the conveying block.

2. The internal storage structure of the vehicle of claim 1, further including:
   a slide panel disposed on the rear surface of the housing, and configured to move forwardly and backwardly by interlocking with the conveying block.

3. The internal storage structure of the vehicle of claim 2, further including:
   at least a holder portion disposed at an end portion of the slide panel where the slide panel faces the cover portion and configured to be moved out to an upper portion of the slide panel.

4. The internal storage structure of the vehicle of claim 3, wherein the at least a holder portion is rotatably coupled to an end portion of the slide panel, and
   wherein the slide panel include at least a receiving groove to selectively receive a corresponding holder portion of the at least a holder portion therein.

5. The internal storage structure of the vehicle of claim 3, Wherein the at least a holder portion is configured to slidably move in a width direction of the slide panel.

6. The internal storage structure of the vehicle of claim 5, wherein the slide panel includes a guide bar and the at least a holder portion is slidably coupled to the guide bar to move in the width direction of the slide panel.

7. The internal storage structure of the vehicle of claim 6, wherein the at least a holder portion is elastically biased in a direction by an elastic member.

8. The internal storage structure of the vehicle of claim 2, further including:
   a slide link interlocking the slide panel and the conveying block.

9. The internal storage structure of the vehicle of claim 8, Wherein a first end portion and a second end portion of the slide link are connected to the housing and the conveying block, respectively, and
   wherein a mid portion of the slide link is coupled to the slide panel.

10. The internal storage structure of the vehicle of claim 9,
    Wherein the first end portion of the slide link is hinged to the housing, and the second end portion thereof connected to the conveying block includes a first groove portion.

11. The internal storage structure of the vehicle of claim 10, wherein the mid portion thereof includes a second groove portion.

12. The internal storage structure of the vehicle of claim 1, further including:
a guide pipe mounted inside the housing and engaged to the conveying block to guide a movement of the conveying block.

13. The internal storage structure of the vehicle of claim 1, further including:
a connection portion connected to the cover portion and slidably coupled to the first guide rail.

14. The internal storage structure of the vehicle of claim 1, further including:
a guide hole in the housing, wherein a connection portion connecting the first guide rail and the cover portion moves along the housing though the guide hole.

15. The internal storage structure of the vehicle of claim 13, further including:
a blocking portion configured to be mounted on a rear surface of the guide hole in a state where the cover portion has been opened.

16. The internal storage structure of the vehicle of claim 1,
wherein the second guide rail is mounted on the housing in the horizontal direction, and
wherein the first guide rail is formed to be inclined in a predetermined acute angle from the horizontal direction.

17. The internal storage structure of the vehicle of claim 1,
wherein the cover portion configured of including a display module or a switch portion.

* * * * *